(12) United States Patent
Zhang et al.

(10) Patent No.: US 8,360,503 B2
(45) Date of Patent: Jan. 29, 2013

(54) SEALING DEVICE DISPOSED BETWEEN A VEHICLE DOOR AND A VEHICLE BODY

(75) Inventors: Liufeng Zhang, Guangxi (CN); Zaili Liu, Guangxi (CN); Zhaoyu Li, Guangxi (CN); Jianshe Chen, Guangxi (CN); Wenwen Liu, Guangxi (CN)

(73) Assignee: Liuzhou Wuling Motors Co., Ltd. (CN)

( * ) Notice: Subject to any disclaimer, the term of this patent is extended or adjusted under 35 U.S.C. 154(b) by 35 days.

(21) Appl. No.: 13/166,001

(22) Filed: Jun. 22, 2011

(65) Prior Publication Data

US 2012/0137594 A1 Jun. 7, 2012

(30) Foreign Application Priority Data

Dec. 6, 2010 (CN) ...................... 2010 2 0643399 U

(51) Int. Cl.
*B60J 7/00* (2006.01)
(52) U.S. Cl. ...................... 296/146.9; 49/502
(58) Field of Classification Search ............... 296/146.9, 296/146.5; 49/502
See application file for complete search history.

(56) References Cited

U.S. PATENT DOCUMENTS 5,787,645 A * 8/1998 Heim et al. ................. 49/502
7,815,246 B2 * 10/2010 Nakamura et al. ......... 296/190.08
8,205,930 B1 * 6/2012 Zhang et al. ............... 296/146.2

* cited by examiner

*Primary Examiner* — Joseph Pape
(74) *Attorney, Agent, or Firm* — Cantor Colburn LLP

(57) ABSTRACT

Disclosed herein is a sealing device disposed between a vehicle door and a vehicle body and a vehicle door sealing rubber strip thereof. The sealing rubber strip is sleeved on a door pipe of the vehicle door. The vehicle door sealing rubber strip is an annular rubber body constituted by a drain segment and a non-drain segment. The annular rubber body includes a hollow rubber ring made of foaming rubber and a groove-shaped rubber ring made of compacted solid rubber and provided with a pipe body mounting groove at the inner side of the groove-shaped rubber ring. An air hole is provided in the hollow rubber ring, and a small water flowing trench is provided at the bottom surface of the pipe body mounting groove of the groove-shaped rubber ring. A fixing groove with a broad bottom and a narrow opening is provided on one external side of the groove-shaped rubber ring. A water flowing channel disposed transversely and a draining through hole communicated with the water flowing trench are provided on the other side surface of the groove-shaped rubber ring at the drain segment. Compared with the prior art, such device can solve the problem of unreliable sealing between a vehicle body doorframe and a vehicle door which are made of circular pipes and the difficulty of draining water accumulated inside the vehicle door.

2 Claims, 5 Drawing Sheets

SEALING DEVICE DISPOSED BETWEEN A VEHICLE DOOR AND A VEHICLE BODY

The present application claims the benefit of priority to Chinese utility model application No. 201020643399.2 titled "A SEALING DEVICE DISPOSED BETWEEN A VEHICLE DOOR AND A VEHICLE BODY AND A VEHICLE DOOR SEALING RUBBER STRIP THEREOF", filed with the Chinese State Intellectual Property Office on Dec. 6, 2010. The entire disclosure thereof is incorporated herein by reference.

TECHNICAL FIELD

The present invention relates to vehicle manufacturing technologies, particular to a sealing device disposed between a vehicle door being of a circular pipe structure and a vehicle body.

BACKGROUND

There are two typical forms for conventional vehicle door sealing device, as shown in FIGS. 1 and 2. In the sealing device disposed between a vehicle door and a vehicle body as shown in FIG. 1, a sealing rubber strip is constituted of a keel rubber portion with a framework inside and a rubber foaming body portion, and the keel rubber strip provided with a groove is installed over a joined edge (also referred to as a front edge in the past) of a steel plate of the vehicle body. In the sealing device disposed between a vehicle door and a vehicle body as shown in FIG. 2, a sealing rubber strip is a rubber foaming body and is connected to a steel plate of the vehicle door with a connecting buckle. Common features between the two devices lie in that a connection surface engaged with the sealing rubber strip is flat such that the rubber strip may be fixed on the flat surface; and a portion with which the rubber foaming body is hermetically engaged is also a flat surface, so that when closing the door, only a radial force is applied to the rubber foaming body of the sealing rubber strip, and is oriented toward a rubber strip mounting base, which will not cause a lateral displacement of the rubber strip relative to the mounting base.

Sealing devices disposed between the vehicle door and the vehicle body in the two structures described above are both applicable to the vehicle body and the vehicle door which are sheet metal parts, but not applicable to the hermetical engagement between a vehicle door and a vehicle body in which the vehicle body doorframe and the vehicle door are both made by bending circular pipes. Since the doorframe and a framework of the door are both have round surfaces, when closing the door, the rubber strip is not only subject to a component force normal to a round cross section of the rubber strip, but also subject to a component force tangent to the round cross section of the rubber strip. Thus, the mounting fixed portion of the rubber strip is likely displaced under the tangential component force. Besides, a vehicle door draining structure of the sealing device disposed between the vehicle door and the vehicle body is shown in FIG. 3. A drain opening is provided at the lowest point A inside the vehicle door and is outside of and below the sealing area, such that the vehicle door sealing rubber strip will not affect draining of the vehicle door. Such structure of the sealing device disposed between the vehicle door and the vehicle body also cannot solve the problem of draining the water accumulated inside the vehicle door which is formed by bending circular pipes.

BRIEF SUMMARY

The invention provides a sealing device disposed between a vehicle door and a vehicle body and a vehicle door sealing rubber strip thereof, which can solve the problem of unreliable sealing between a vehicle body doorframe and a vehicle door which are made of circular pipes and the difficulty of draining water accumulated inside the vehicle door.

In order to solve the above-mentioned problems, a vehicle door sealing rubber strip according to the present invention is an annular rubber body constituted by a drain segment and a non-drain segment. The annular rubber body includes a hollow rubber ring made of foaming rubber and a groove-shaped rubber ring made of compacted solid rubber and provided with a pipe body mounting groove at the inner side of the groove-shaped rubber ring, an air hole is provided in the hollow rubber ring, a small water flowing trench is provided at a bottom surface of the pipe body mounting groove of the groove-shaped rubber ring, a fixing groove with a broad bottom and a narrow opening is provided on one external side of the groove-shaped rubber ring; at the drain segment and on the other side opposite to the fixing groove, a height of a wall of the groove-shaped rubber ring at the drain segment is lower than that at the non-drain segment on the same side, an external surface of the wall of the groove-shaped rubber ring at the drain segment is recessed inwardly relative to an external surface of a wall at the non-drain segment on the same side, so as to form a water flowing channel; and a draining through hole communicated with the small water flowing trench is provided in the wall of the drain segment at the other side.

The sealing device disposed between the vehicle door and the vehicle body according to the present invention employs the above-mentioned vehicle door sealing rubber strip. The sealing device includes a doorframe formed of circular pipes and provided on the vehicle body, a door pipe at an outer edge of the vehicle door formed of circular pipes, and a vehicle door sealing rubber strip, wherein the vehicle door sealing rubber strip is an annular rubber body constituted by a drain segment and a non-drain segment, the annular rubber body includes a hollow rubber ring made of foaming rubber and a groove-shaped rubber ring made of compacted solid rubber and provided with a pipe body mounting groove at the inner side of the groove-shaped rubber ring, the pipe body mounting groove is sleeved on the door pipe, the drain segment is provided at a lowest portion of the door pipe, and a small water flowing trench is provided between the door pipe and a bottom surface of the pipe body mounting groove outside the door pipe; an air hole is provided in the hollow rubber ring, a fixing groove with a broad bottom and a narrow opening is provided on one external side of the groove-shaped rubber ring; at the drain segment and on the other side opposite to the fixing groove, a height of a wall of the groove-shaped rubber ring at the drain segment is lower than that at the non-drain segment on the same side, an external surface of the wall of the groove-shaped rubber ring at the drain segment is recessed inwardly relative to an external surface of a wall at the non-drain segment on the same side, so as to form a water flowing channel; and a draining through hole communicated with the small water flowing trench is provided in the wall of the drain segment at the other side.

Compared with the prior art, the present invention have following advantages due to the above-mentioned technical solution.

First, the problem of unreliable sealing between the vehicle body doorframe and the vehicle door which are made of circular pipes is solved. The vehicle door sealing rubber strip may be firmly installed on the circular-pipe framework of the vehicle door and has a good sealing effect.

Second, the problem of unsmooth draining of the vehicle door made of circular pipes is solved. The rubber strip draining structure located at the lower portion of the vehicle door solves the contradiction between the sealing and the draining, which may completely drain the water accumulated inside the vehicle door.

DETAILED DESCRIPTION

Hereinafter, a vehicle door sealing rubber strip and a sealing device disposed between a vehicle door and a vehicle body according to the present invention will be further described in detail in conjunction with drawings and embodiments.

Figure 1:
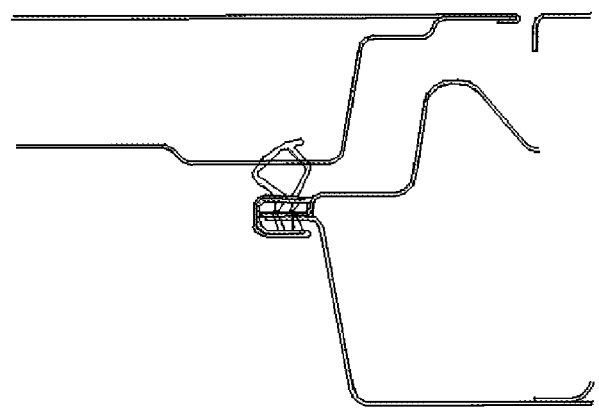
FIG. 1 is a schematic view of the structure of a conventional sealing device disposed between a vehicle door and a vehicle body.
Figure 2:
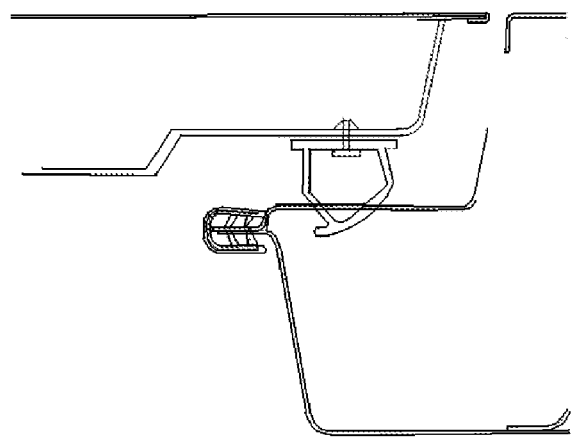
FIG. 2 is a schematic view of the structure of another conventional sealing device disposed between a vehicle door and a vehicle body.
Figure 3:
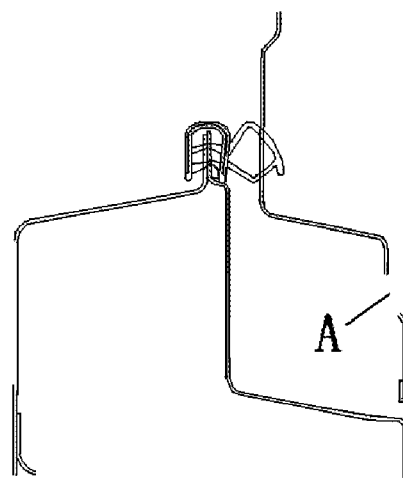
FIG. 3 is a schematic view of the structure of a drain opening of the conventional sealing device disposed between the vehicle door and the vehicle body.
Figure 4:
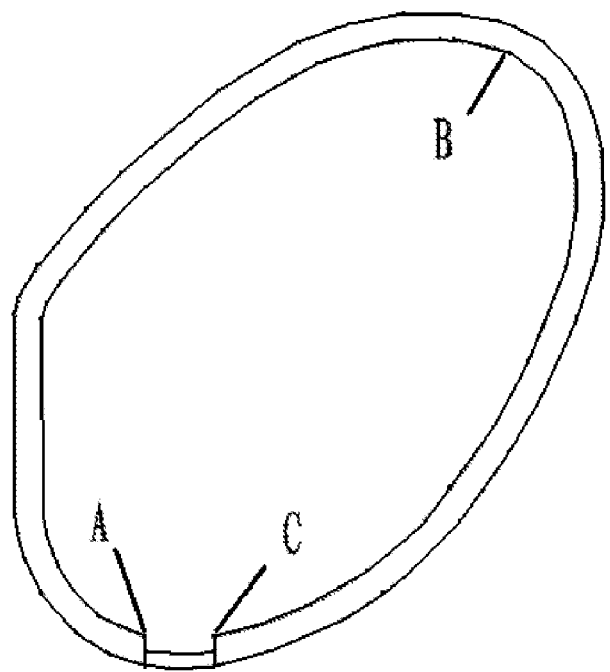
FIG. 4 is a schematic view of the structure of a embodiment of a vehicle door sealing rubber strip according to the present invention.
Figure 5:
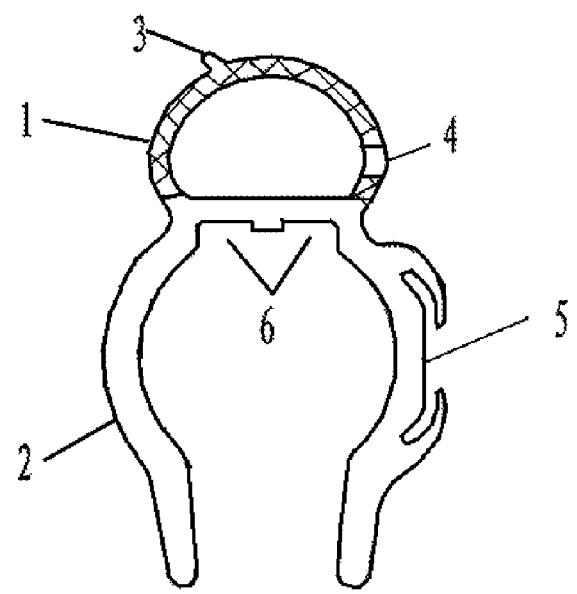
FIG. 5 is a cross section structural schematic view of a non-drain segment at the upper portion of the embodiment of the vehicle door sealing rubber strip according to the present invention.
Figure 6:
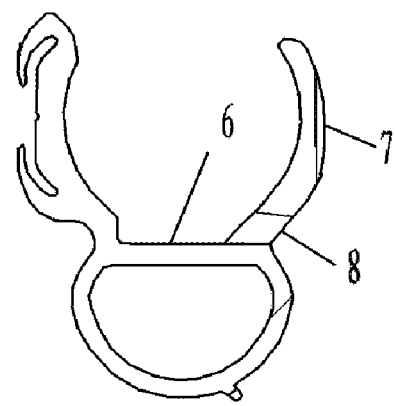
FIG. 6 is a cross section structural schematic view of a drain segment at the lower portion of the embodiment of the vehicle door sealing rubber strip according to the present invention.

The vehicle door sealing rubber strip of the present invention is shown in FIGS. 4 to 6. The vehicle door sealing rubber strip as shown in FIG. 4 is an annular rubber body constituted by a drain segment and a non-drain segment. In FIG. 4, a segment from A to B and then to C is non-drain segment, and a cross section of the non-drain segment is shown in FIG. 5. In FIG. 4, a segment between A and C is the drain segment, and a cross section of the drain segment is shown in FIG. 6.

As shown in FIG. 5, the entire annular rubber body including the drain segment and the non-drain segment has the following structural features. The annular rubber body includes a hollow rubber ring 1 made of foaming rubber and a groove-shaped rubber ring 2 made of compacted solid rubber and provided with a pipe body mounting groove at its inner side. The hollow rubber ring 1 is provided with a lip 3 and an air hole 4, small water flowing trenches 6 are provided at the bottom of the pipe body mounting groove of the groove-shaped rubber ring 2, a fixing groove 5 with a broad bottom and a narrow opening is provided on an external side of the groove-shaped rubber ring.

As shown in FIG. 6, in the drain segment, a water flowing channel 7 disposed transverse to the axis of the annular rubber body is provided on the other external side of the groove-shaped rubber ring 2 opposite to the fixing groove 5, and draining through holes 8 communicated with the small water flowing trenches 6 are provided in the wall at said external side.

Figure 7:
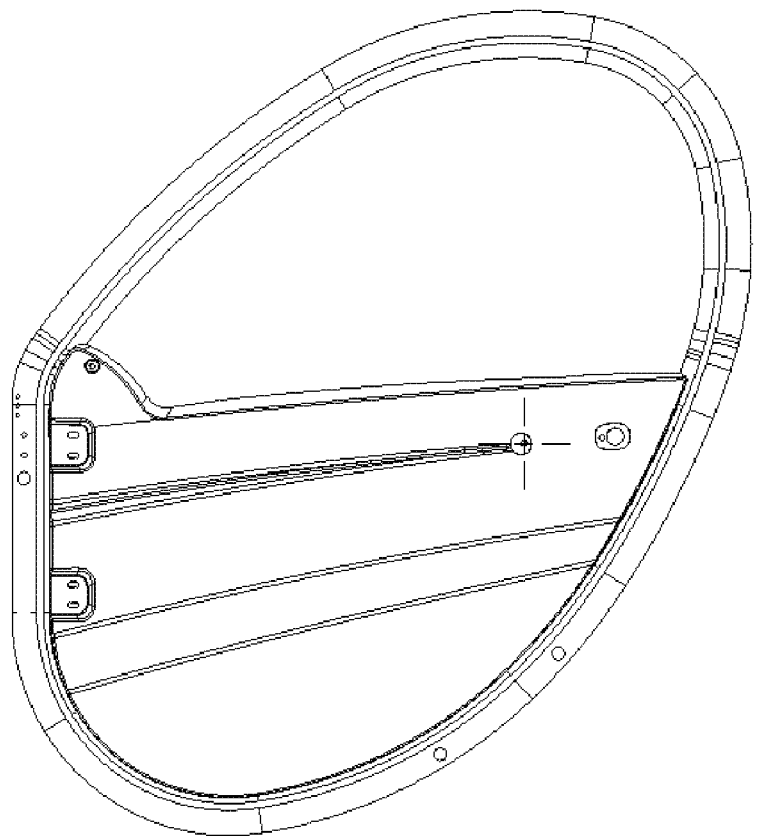
FIG. 7 is a schematic view of the structure of a vehicle door in the embodiment of the sealing device disposed between the vehicle door and the vehicle body according to the present invention.
Figure 8:
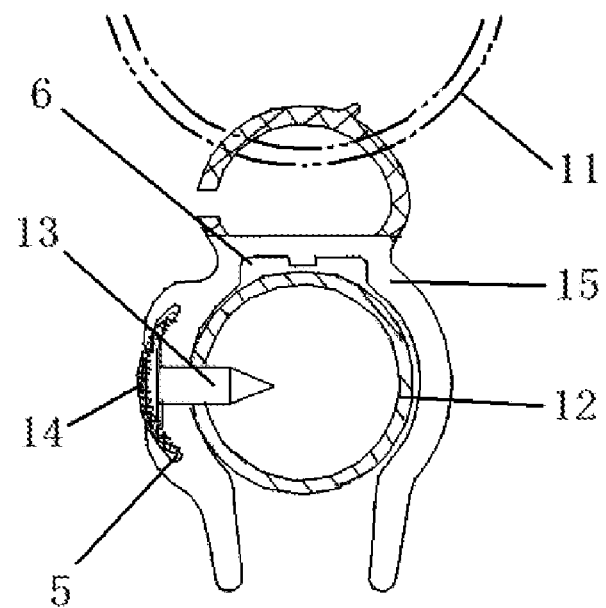
FIG. 8 is a cross section structural schematic view showing an engagement between the vehicle door and the upper portion of the vehicle body in the embodiment of the sealing device disposed between the vehicle door and the vehicle body according to the present invention.
Figure 9:
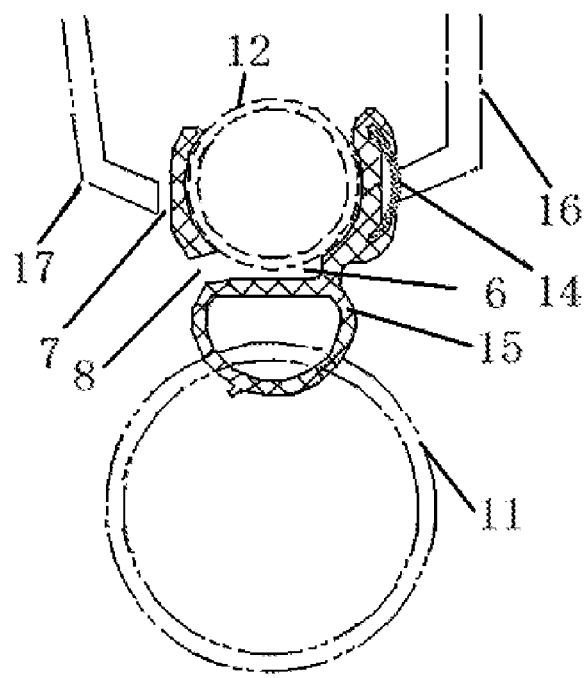
FIG. 9 is a cross section structural schematic view showing an engagement between the vehicle door and the lower portion of the vehicle body in the embodiment of the sealing device disposed between the vehicle door and the vehicle body according to the present invention.

The sealing device disposed between the vehicle door and the vehicle body according to the present invention is shown in FIGS. 7 to 9. FIG. 7 is a schematic view of the structure of the vehicle door installed with the above sealing rubber strip.

As shown in FIGS. 8 and 9, the sealing device disposed between the vehicle door and the vehicle body according to the present invention includes a doorframe 11 formed of circular pipes and provided on the vehicle body, a door pipe 12 at the outer edge of the vehicle door formed of circular pipes, and the vehicle door sealing rubber strip 15 as shown in FIGS. 4 to 6 sleeved on the door pipe 12. The vehicle door sealing rubber strip 15 is fixed onto the door pipe 12 via nails 13 which are covered by a decorating strip 14 embedded in the fixing groove 5 of the vehicle door sealing rubber strip 15.

As shown in FIG. 8, two small water flowing trenches 6 are provided between the door pipe 12 and the bottom surface of the pipe body mounting groove outside the door pipe 12.

As shown in FIG. 9, the drain segment of the vehicle door sealing rubber strip 15 is provided at the lowest portion of the door pipe 12. On the other external side of the drain segment of the vehicle door sealing rubber strip 15 opposite to the fixing groove 5, a water flowing channel 7 disposed transverse to the axis of the annular rubber body is provided such that water inside vehicle plates 16 and 17 may be discharged through the water flowing channel 7, and draining through holes 8 communicated with the water flowing trenches 6 are provided in the wall of the vehicle door sealing rubber strip 15 at said external side, such that water between the door pipe 12 and the vehicle door sealing rubber strip 15 may be discharged outside the vehicle door sealing rubber 15.

Figure 10:
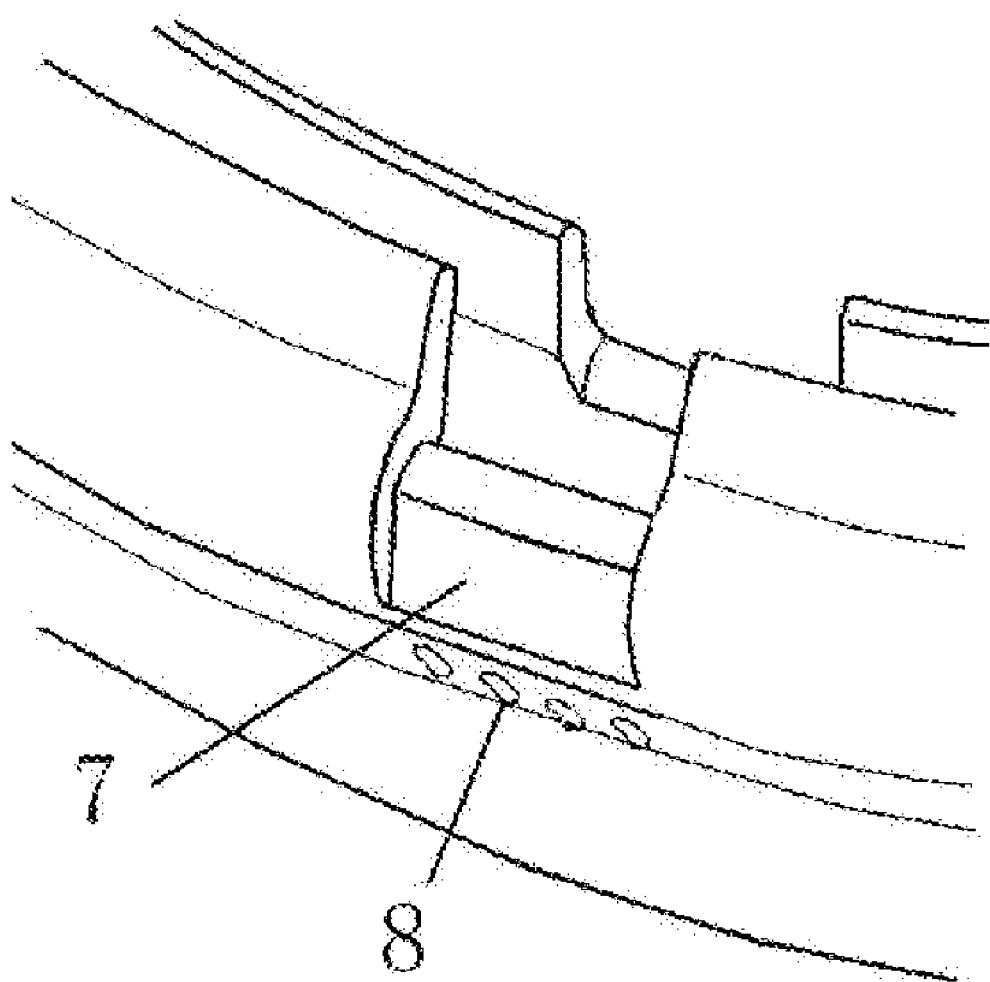
FIG. 10 is a schematic view of the structure of a drain segment of the vehicle door sealing rubber strip.

FIG. 10 shows the other side of the drain segment opposite to the fixing groove. The height of the wall of the groove-shaped rubber ring at the drain segment is lower than that at the non-drain segment on the same side, and the external surface of the wall of the groove-shaped rubber ring at the drain segment is recessed inwardly relative to the external surface of the wall at the non-drain segment on the same side so as to form the water flowing channel 7, and draining through holes 8 communicated with the small water flowing trenches are provided in the wall of the drain segment at this side.

What is claimed is:

1. A sealing device disposed between a vehicle door and a vehicle body, comprising a doorframe formed of circular pipes and provided on the vehicle body, a door pipe at an outer edge of the vehicle door formed of circular pipes, and a vehicle door sealing rubber strip, wherein the vehicle door sealing rubber strip is an annular rubber body constituted by a drain segment and a non-drain segment, the annular rubber body comprises a hollow rubber ring made of foaming rubber and a groove-shaped rubber ring made of compacted solid rubber and provided with a pipe body mounting groove at the inner side of the groove-shaped rubber ring, the pipe body mounting groove is sleeved on the door pipe, the drain segment is provided at a lowest portion of the door pipe, and a small water flowing trench is provided between the door pipe and a bottom surface of the pipe body mounting groove outside the door pipe; an air hole is provided in the hollow rubber ring, a fixing groove with a broad bottom and a narrow opening is provided on one external side of the groove-shaped rubber ring; at the drain segment and on the other side opposite to the fixing groove, a height of a wall of the groove-shaped rubber ring at the drain segment is lower than that at the non-drain segment on the same side, an external surface of the wall of the groove-shaped rubber ring at the drain segment is recessed inwardly relative to an external surface of a wall at the non-drain segment on the same side, so as to form a water flowing channel; and a draining through hole communicated with the small water flowing trench is provided in the wall of the drain segment at the other side.

2. A vehicle door sealing rubber strip, being an annular rubber body which is constituted by an drain segment and a non-drain segment, wherein the annular rubber body comprises a hollow rubber ring made of foaming rubber and a groove-shaped rubber ring made of compacted solid rubber and provided with a pipe body mounting groove at the inner side of the groove-shaped rubber ring, an air hole is provided in the hollow rubber ring, a small water flowing trench is provided at a bottom surface of the pipe body mounting groove of the groove-shaped rubber ring, a fixing groove with a broad bottom and a narrow opening is provided on one external side of the groove-shaped rubber ring; at the drain segment and on the other side opposite to the fixing groove, a height of a wall of the groove-shaped rubber ring at the drain segment is lower than that at the non-drain segment on the same side, an external surface of the wall of the groove-shaped rubber ring at the drain segment is recessed inwardly relative to an external surface of a wall at the non-drain segment on the same side, so as to form a water flowing channel; and a draining through hole communicated with the small water flowing trench is provided in the wall of the drain segment at the other side.

\* \* \* \* \*